United States Patent
Bernard et al.

(10) Patent No.: US 9,542,688 B2
(45) Date of Patent: Jan. 10, 2017

(54) METHOD AND SYSTEM FOR TARGETING SMALL BUSINESSES

(71) Applicant: MasterCard International Incorporated, Purchase, NY (US)

(72) Inventors: Serge Bernard, Danbury, CT (US); Luckner Polycarpe, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/643,380

(22) Filed: Mar. 10, 2015

(65) Prior Publication Data

US 2016/0267495 A1    Sep. 15, 2016

(51) Int. Cl.
G06K 5/00      (2006.01)
G06K 15/00    (2006.01)
G06Q 30/02    (2012.01)

(52) U.S. Cl.
CPC ................. *G06Q 30/0201* (2013.01)

(58) Field of Classification Search
USPC ... 235/375, 383, 385, 376, 380; 705/1–26.1, 705/1–26
See application file for complete search history.

(56) References Cited

U.S. PATENT DOCUMENTS

| | | |
|---|---|---|
| 7,853,469 B2 | 12/2010 | Maitland et al. |
| 8,229,783 B2 | 7/2012 | Hamlisch et al. |
| 8,396,750 B1 * | 3/2013 | Hariharan ............. G06Q 30/00 705/26.1 |
| 8,725,597 B2 | 5/2014 | Mauseth et al. |
| 2006/0036510 A1 * | 2/2006 | Westphal ............. G06Q 30/02 705/26.62 |
| 2008/0208705 A1 * | 8/2008 | Kern .................. G06Q 30/0601 705/26.1 |
| 2009/0271246 A1 | 10/2009 | Alvarez et al. |

(Continued)

OTHER PUBLICATIONS

Lau, et al., 'Next Product to Offer' for Bank Marketers, Journal of Database Marketing, Jul. 2003, pp. 353-368, vol. 10, 4, Henry Stewart Publications 1350-2328 (2003).

(Continued)

*Primary Examiner* — Tuyen K Vo
(74) *Attorney, Agent, or Firm* — Buchanan Ingersoll & Rooney (57) ABSTRACT

A method for identifying business service recommendations includes: storing merchant profiles, each profile including data related to a merchant including a merchant identifier and transaction for a plurality of payment transactions; receiving, a data file including a plurality of merchant entries, each entry including data related to a merchant including a merchant identifier and firmographics; identifying a specific merchant entry where the merchant identifier corresponds to a merchant identifier in a specific merchant profile; calculating transaction scores for the specific merchant entry based on the transaction data in the specific merchant profile; identifying a related merchant entry where the firmographics correspond to the firmographics in the specific merchant entry and where the merchant identifier is not included in a merchant profile; and identifying one or more business service recommendations for the merchant related to the related merchant entry based on transaction scores and firmographics in the related merchant entry.

20 Claims, 6 Drawing Sheets

(56) References Cited

U.S. PATENT DOCUMENTS

| | | | |
|---|---|---|---|
| 2010/0228628 A1* | 9/2010 | Dufour | G06Q 30/02 705/14.53 |
| 2011/0313781 A1* | 12/2011 | Ho | G06Q 30/02 705/1.1 |
| 2012/0316986 A1* | 12/2012 | Levy | G06Q 30/00 705/26.7 |
| 2014/0122229 A1* | 5/2014 | Clark | G06Q 30/0255 705/14.53 |
| 2014/0278744 A1* | 9/2014 | Lo Faro | G06Q 30/0201 705/7.29 |
| 2014/0372338 A1* | 12/2014 | Kim | G06Q 30/0282 705/347 |
| 2015/0032565 A1* | 1/2015 | Weis | G06Q 30/0631 705/26.7 |

OTHER PUBLICATIONS

Melville, et al., Customer Targeting Models Using Actively-Selected Web Content, KDD'08, Aug. 24-27, 2008, pp. 946-953, IBM T.J. Watson Research Center, Las Vegas, Nevada.

Giering, et al., Retail Sales Prediction and Item Recommendations Using Customer Demographics at Store Level, SIGKDD Explorations, pp. 84-89, vol. 10 issue 2.

* cited by examiner

METHOD AND SYSTEM FOR TARGETING SMALL BUSINESSES

FIELD

The present disclosure relates to the identification of recommended business services for merchants, specifically the use of firmographics and transaction score data known for a merchant to identify recommended business services for a similar merchant.

BACKGROUND

In many places, small businesses are staples of their community. Small businesses are often owned by local residents who are native to the area, that hold a desire to give back to their community by way of offering quality goods and services to their fellow residents. However, as large, national and international business chains continue to grow, these large businesses often move in to the territory served by these small, local businesses. The large businesses, having such a large infrastructure, often have the ability to sell goods and services for lower profit margins, and can many times undercut the local small businesses. The result is that these small business can often struggle to survive when a large, national or international business moves in to the area.

In some instances, small businesses find unique goods or services to offer that are not provided by larger businesses, which can provide for sufficient revenue to help maintain a profitable business. However, some small businesses may lack the technology or ability to locate such goods or identify services that they may offer local consumers in an effort to distinguish themselves from other businesses. In addition, small businesses may also often be unaware of internal services that may be utilized or improved that can decrease overhead, increase production, or otherwise provide positive value and increase net profit for the business, such as information technology, inventory, and management services.

Thus, there is a need for a technical solution to identify business services that may be utilized by small businesses that can decrease overhead, increase profits, increase consumer services, or otherwise improve the small business.

SUMMARY

The present disclosure provides a description of systems and methods for identification of business service recommendations for targeted merchants.

A method for identifying business service recommendations for targeted merchants includes: storing, in a merchant database, a plurality of merchant profiles, wherein each merchant profile includes data related to a merchant including at least a merchant identifier and a plurality of transaction data entries, each transaction data entry including data related to a payment transaction; receiving, by a receiving device, a data file including a plurality of merchant data entries, wherein each merchant data entry includes data related to a merchant including at least a merchant identifier and a plurality of firmographics; identifying, by a processing device, a specific merchant data entry of the plurality of merchant data entries where the included merchant identifier corresponds to a merchant identifier included in a specific merchant profile stored in the merchant database; calculating, by the processing device, one or more transactions scores for the merchant related to the specific merchant data entry based on at least the data included in one or more transaction data entries included in the specific merchant profile; identifying, by the processing device, a related merchant data entry of the plurality of merchant data entries where the included plurality of firmographics correspond to the plurality of firmographics included in the identified specific merchant data entry and where the included merchant identifier is not included in a merchant profile stored in the merchant database; and identifying, by the processing device, one or more business service recommendations for the merchant related to the identified related merchant data entry based on at least the calculated one or more transaction scores and the plurality of firmographics included in the identified related merchant data entry.

A system for identifying business service recommendations for targeted merchants includes a merchant database, a receiving device, and a processing device. The merchant database is configured to store a plurality of merchant profiles, wherein each merchant profile includes data related to a merchant including at least a merchant identifier and a plurality of transaction data entries, each transaction data entry including data related to a payment transaction. The receiving is device configured to receive a data file including a plurality of merchant data entries, wherein each merchant data entry includes data related to a merchant including at least a merchant identifier and a plurality of firmographics. The processing device is configured to: identify a specific merchant data entry of the plurality of merchant data entries where the included merchant identifier corresponds to a merchant identifier included in a specific merchant profile stored in the merchant database; calculate one or more transactions scores for the merchant related to the specific merchant data entry based on at least the data included in one or more transaction data entries included in the specific merchant profile; identify a related merchant data entry of the plurality of merchant data entries where the included plurality of firmographics correspond to the plurality of firmographics included in the identified specific merchant data entry and where the included merchant identifier is not included in a merchant profile stored in the merchant database; and identify one or more business service recommendations for the merchant related to the identified related merchant data entry based on at least the calculated one or more transaction scores and the plurality of firmographics included in the identified related merchant data entry.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

System for Identifying Recommended Business Services

Figure 1:
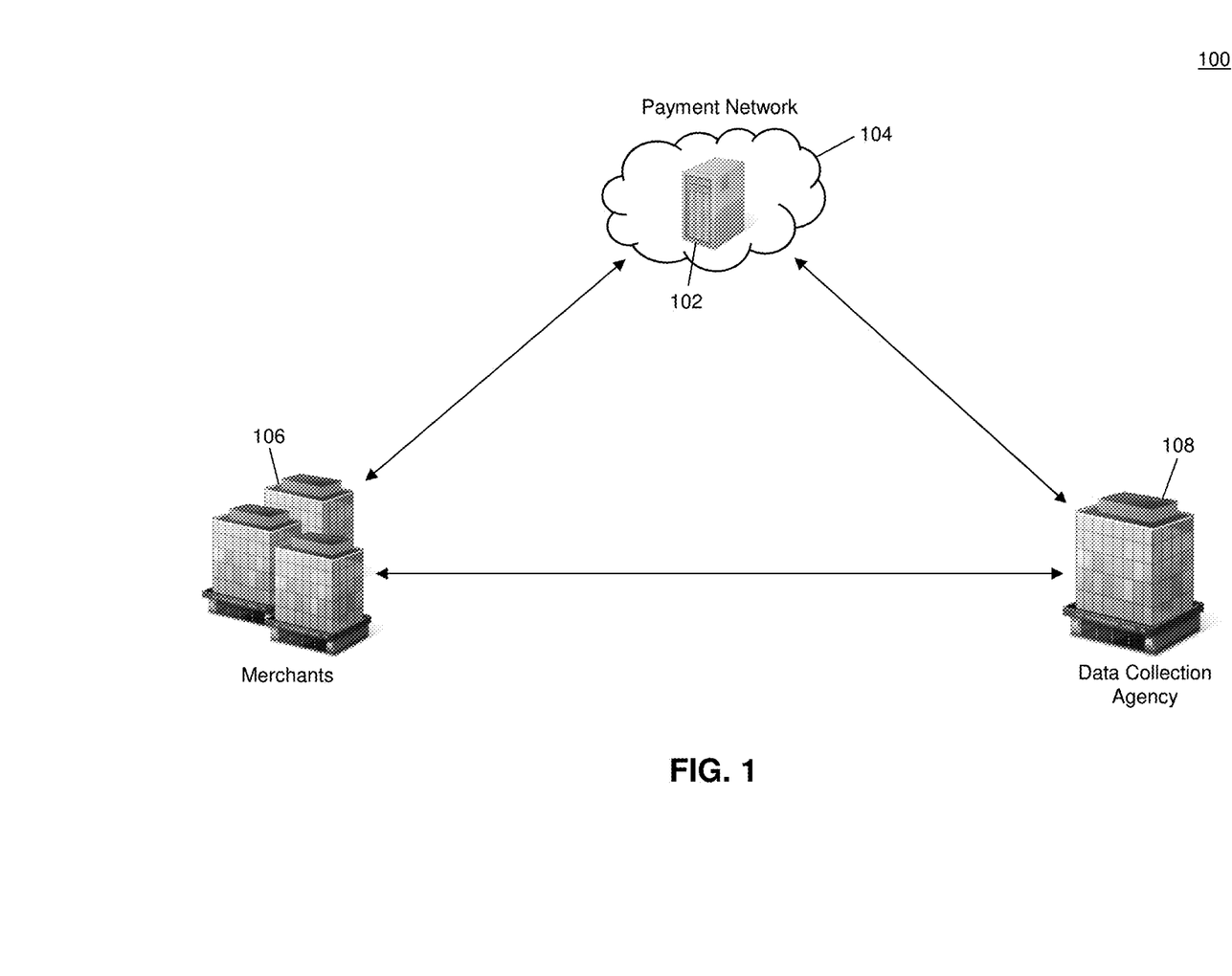
FIG. 1 is a high level architecture illustrating a system for identifying business service recommendations in accordance with exemplary embodiments.

FIG. 1 illustrates a system 100 for the identification of business service recommendations for targeted merchants.

The system 100 may include a processing server 102. The processing server 102, discussed in more detail below, may be configured to identify business service recommendations for merchants. The processing server 102 may be a part of a payment network 104 configured to process payment transactions using methods and systems that will be apparent to persons having skill in the relevant art. As part of the processing of payment transactions, the payment network 104 may provide transaction data to the processing server 102.

The processing server 102 may store transaction data for merchants 106 for whom the payment network 104 processing payment transactions. For example, the payment network 104 may be a credit card processing network, and the processing server 102 may therefore obtain transaction data for merchants 106 who accept credit cards associated with that processing network. The processing server 102 may calculate transaction scores for each merchant 106 for whom transaction data is obtained. Transaction scores may include one or more business metrics, purchase behaviors, or other values indicative of business performance in any of a plurality of business criteria that can be calculated and/or identified based on transaction data.

For example, transaction scores may include scores based on overall revenue, revenue per consumer, transaction frequency, transaction frequency per consumer, average ticket size, predicted future revenue or sales, etc. across one or more categories, such as for a specific industry, specific product type, specific period of type, specific demographic of consumer, etc. In some instances, transaction scores may be calculated with respect to specific business services, such as calculating revenue scores for a merchant 106 before and after the implementation of a new business service, such as new inventory management software.

The system 100 may also include a data collection agency 108. The data collection agency 108 may be an entity that is configured to obtain business service and other business data from the merchant 106, including merchants 106 for whom the payment network 104 does not process payment transactions. The data collection agency 108 may be, for example, a consulting firm, a credit bureau, a research firm, an industry association, etc. Data collected by the data collection agency 108 may include various firmographics, such as, for instance, business age, business size, organization type, ownership type, market data, stage data, trend data, customer type, property type, residency, manufacturing type, technology data, service data, etc.

The data collection agency 108 may provide the collected firmographics to the processing server 102 of the payment network 104. The processing server 102 may then associate the firmographics with transaction scores for merchants 106 for whom transaction data has been obtained. For merchants 106 for whom the processing server 102 does not possess transaction data, the processing server 102 may be configured to identify related merchants. Related merchants may include merchants 106 for whom transaction scores have been calculated, and may be identified based on comparison of the corresponding firmographics. For example, the processing server 102 may find a related merchant for a merchant 106 that has the same business size, business type, business age, location data, and situated in a similar market based on the firmographics.

The processing server 102 may then identify one or more recommended business services for the merchant 106. The business service recommendations may be based on additional firmographics data for the related merchant, firmographics of the target merchant 106, the transaction scores of the related merchant, and any other suitable data. For example, the processing server 102 may identify transaction scores for the related merchant that shows improvement in consumer satisfaction and net profit with the use of a specific business service, which the processing server 102 may then recommend to the target merchant 106. In another example, the processing server 102 may identify transaction scores that indicate a high volume of business for the related merchant, and may suggest use of the payment network 104 for the target merchant 106 to decrease expenses by way of reduced processing fees for a such a large volume.

In another example, one or more related merchants of a target merchant 106 may have transaction scores that indicate a high propensity for sales for a specific product, which the processing server 102 may recommend to the target merchant 106 to being carrying or to increase the quantity of that specific product. In yet another example, the processing server 102 may recommend new locations for the target merchant 106 based on location data and transaction scores for related merchants in other geographic locations, such as by identifying an area where the target merchant 106 may have success based on the successes of related merchants in similar areas.

By identifying recommended business services using transaction scores of merchants that have similar firmographics, the processing server 102 may be able to identify business services for a target merchant 106 that are ideally suited for the target merchant 106 and that may be otherwise unknown to the target merchant 106. In addition, the processing server 102 may also be able to provide for networking to recommended service providers or other related services, which may not only notify a target merchant 106 of a new and beneficial service, but may also be able to provide the target merchant 106 with assistance in procuring a business service, even if the target merchant 106 was already aware of the service. In addition, by having transaction scores for a plurality of related merchants, the processing server 102 may also be able to identify business services that have been unsuccessful in related businesses and may thereby be able to recommend both services that the target merchant 106 may prefer to avoid as well as business services the target merchant 106 may already use that could be replaced by a more successful and profitable business service. As a result, the processing server 102 may provide target merchants 106 with beneficial business service recommendations that may be otherwise unavailable to the target merchants 106, particularly for small businesses who may be unfamiliar with many of the services or lack the ability or knowledge to identify, select, and implement such services.

Processing Server

Figure 2:
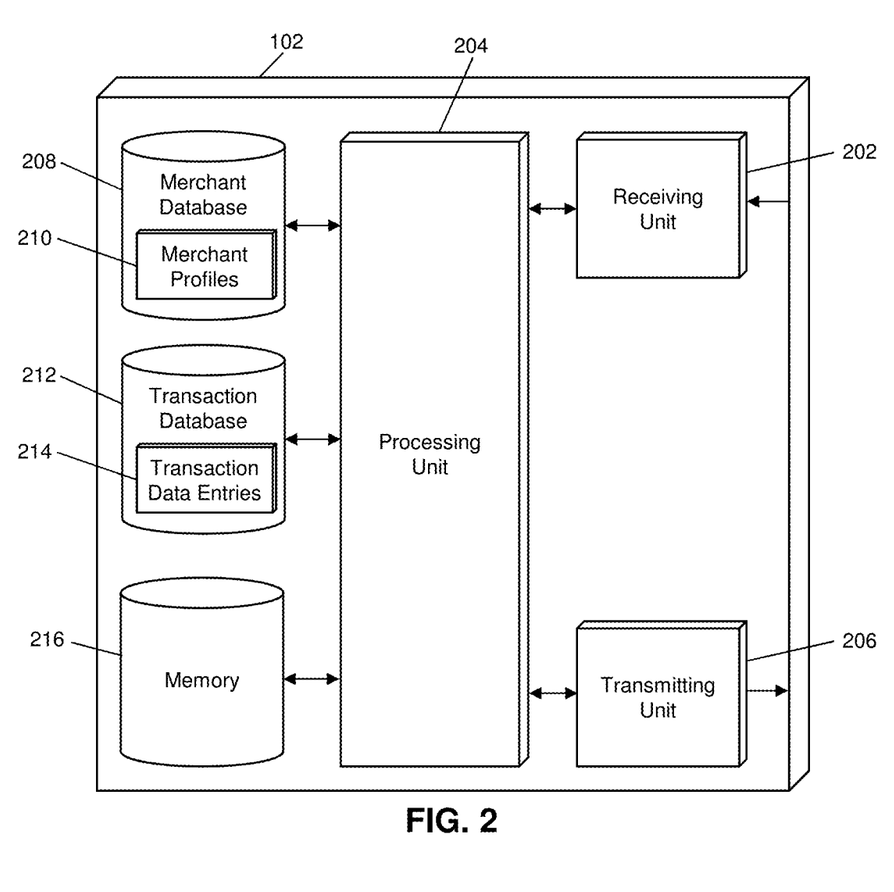
FIG. 2 is a block diagram illustrating the processing server of FIG. 1 for the identification of business service recommendations for targeted merchants in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving unit 202. The receiving unit 202 may be configured to receive data over one or more networks via one or more network protocols. The receiving unit 202 may receive transaction data from the payment network 104 or from other suitable sources, such as directly from merchants 106, financial institutions (e.g., issuers, acquirers, etc.), third party payment networks, etc. In instances where the processing server 102 may be configured to process payment transactions from the payment network 104, the receiving unit 202 may be configured to receive transaction data as part of payment network processing.

The processing server 102 may also include a merchant database 208. The merchant database 208 may be configured to store a plurality of merchant profiles 210. Each merchant profile 210 may include data related to a merchant 106 and may include at least a merchant identifier. The merchant identifier may be a unique value associated with the related merchant 106 or the merchant profile 210 used for identification thereof. The merchant identifier may be, for example, a merchant identification number, registration number, point of sale identifier, routing number, transaction account number, etc.

In some embodiments, each merchant profile 210 may also include transaction data for a plurality of payment transactions involving the related merchant 106. In other embodiments, the processing server 102 may include a separate transaction database 212 used to store transaction data. The transaction database 212 may include a plurality of transaction data entries 214. Each transaction data entry 214 may be related to a payment transaction and may include data associated with the payment transaction and a merchant identifier associated with a merchant 106 involved in the payment transaction. In instances where the processing server 102 includes the transaction database 212, transaction data corresponding to a merchant profile 210 may be identified using the included merchant identifiers.

The processing server 102 may also include a processing unit 204. The processing unit 204 may be configured to perform the functions of the processing server 102 as discussed herein, as will be apparent to persons having skill in the relevant art. For example, in embodiments where the processing server 102 includes the transaction database 212, the processing unit 204 may be configured to identify transaction data entries 214 for a specific merchant profile 210 based on the inclusion of the merchant identifier included in the specific merchant profile 210.

The processing unit 204 may be configured to calculate transaction scores for each merchant profile 210. The transaction scores may be based on data included in the merchant profile 210, including data related to payment transactions involving the related merchant 106, which may be included directly in the merchant profile 210 or in corresponding transaction data entries 214 in the transaction database 212. Transaction scores may include one or more propensities, metrics, or statistics based on the transaction data for one or more of a plurality of criteria or categories. In some embodiments, the transaction scores may be calculated using one or more rules or algorithms, which may be stored in a memory 216 of the processing server 102.

The memory 216 may be configured to store data suitable for performing the functions of the processing server 102 discussed herein. For example, the memory 216 may store rules or algorithms for the calculation of transaction scores, for the identification of business service recommendations, for the identification of related merchants using firmographics and other data, etc. Additional data that may be stored in the memory 216 will be apparent to persons having skill in the relevant art.

The receiving unit 202 may be further configured to receive a data file from a third party, such as from the data collection agency 108. The data file may include firmographics and merchant identifiers for a plurality of merchants 106. In some embodiments, the plurality of merchants 106 for whom data is included in the data file may include merchants 106 for whom there is no corresponding merchant profile 210 stored in the merchant database 208.

The processing unit 204 may be configured to match firmographics included in the data file with corresponding merchant profiles 210 based on the corresponding merchant identifiers, if a merchant profile 210 is included in the merchant database 208 that has a matching merchant identifier. The processing unit 204 may store the firmographics in the matched merchant profile 210 in the merchant database 208. For firmographics that accompany a merchant identifier for which there is no corresponding merchant profile 210, the processing unit 204 may be configured to identify a related merchant profile 210. A related merchant profile 210 may be identified based on correspondence between the firmographics for the target merchant identifier and the firmographics for the related merchant profile 210. In some instances, the processing unit 204 may store merchant identifiers in a merchant profile 210 that correspond to a related target merchant.

The processing unit 204 may be further configured to identify business service recommendations for target merchants 106. Target merchants 106 may be merchants 106 for whom firmographics are known, but for whom transaction data and/or transaction scores are unknown. The business service recommendations may be identified based on the firmographics for the target merchant 106 or related merchant(s) as well as the transaction scores and any other suitable data for the related merchant(s).

The processing server 102 may also include a transmitting unit 206. The transmitting unit 206 may be configured to transmit data over one or more networks via one or more network protocols. The transmitting unit 206 may transmit business service recommendations, such as to the target merchants 106, to entities associated with the target merchants 106 (e.g., parent companies, financial institutions, service providers, etc.). The transmitting unit 206 may also be configured to transmit data requests, such as to the payment network 104 (e.g., for transaction data), the data collection agency 108 (e.g., for firmographics data), the merchants 106, and other third parties.

It will be apparent to persons having skill in the relevant art that the processing server 102 may include additional and/or alternative components to the components illustrated in FIG. 2 and discussed herein, and that the components illustrated in FIG. 2 may be further configured to perform additional functions. For example, in embodiments where the processing server 102 may be configured to process payment transactions for the payment network 104, the components of the processing server 102 may be further configured to perform additional functions necessary for the processing of payment transactions, such as the receiving and transmitting of authorization requests and responses, processing and application of fraud rules, etc.

Process for Recommending Business Services

Figure 3:
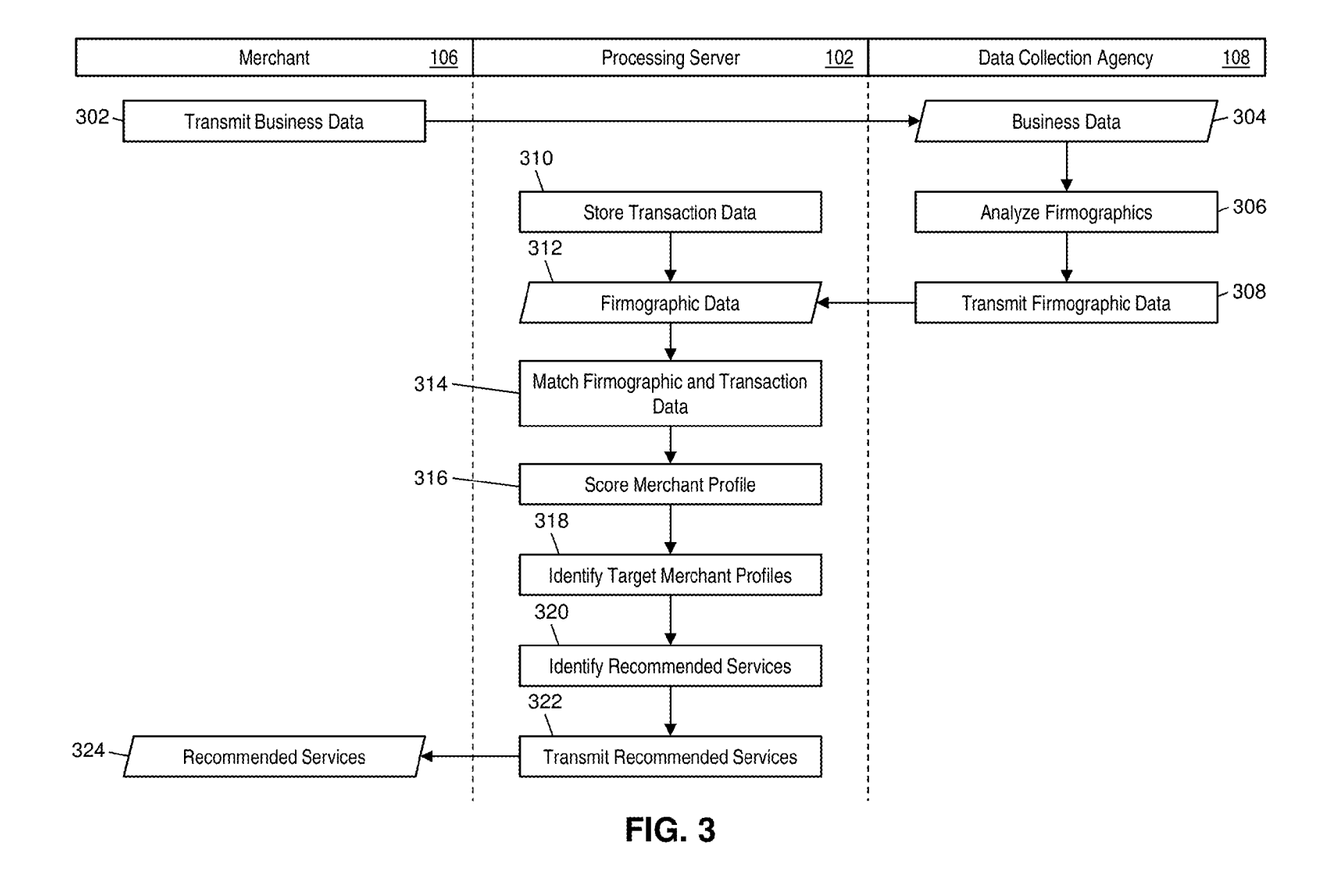
FIG. 3 is a flow diagram illustrating a process for recommending business services to a targeted merchant using the system of FIG. 1 in accordance with exemplary embodiments.

FIG. 3 illustrates a process for the identification of recommended business services for a targeted merchant and the recommending thereof based on firmographics and transaction data.

In step 302, a target merchant 106 may transmit business data to the data collection agency 108. The business data may include firmographics associated with the target merchant 106, such as business size, business type, customer data, residency, market data, geographic location, manufacturing data, business services, service provider data, etc., or data used in the calculation and/or identification thereof. In step 304, the data collection agency 108 may receive the business data, and, in step 306, may analyze the provided business data for use in calculating and/or identifying firmographics for the target merchant 106.

In step 308, the data collection agency 108 may transmit the firmographics data for the target merchant 106, as well as firmographics data for other merchants, to the processing server 102. In step 310, the processing unit 204 of the processing server 102 may store transaction data and other merchant data in the merchant database 208 and/or the transaction database 212. The transaction data may include data related to payment transactions involving merchants, such as transaction amounts, transaction time and/or dates, product data, merchant data, point of sale data, offer data, loyalty data, geographic locations, etc.

In step 312, the receiving unit 202 of the processing server 102 may receive the firmographics data from the data collection agency 108. The firmographics data may be included in a data file and may include a merchant identifier associated with each merchant for whom firmographics data has been provided. In step 314, the processing unit 204 may match the received firmographics data to transaction data and other merchant data included in the merchant profiles 210. Matching of the firmographics data to transaction data may include matching merchant identifiers for the data, such that a single merchant identifier corresponds to firmographics data and transaction data. In some instances, firmographics data may be matched to a merchant profile 210, and/or a merchant profile 210 may be generated for a received set of firmographics data, for which no corresponding transaction data has been obtained. For example, the processing unit 204 may generate a merchant profile 210 for the target merchant 106 and its corresponding firmographics data, without possession of associated transaction data.

In step 316, the processing unit 204 may calculate transaction scores for each merchant profile 210 for whom transaction data and firmographics data has been obtained. The transaction scores may be calculated using one or more rules or algorithms and may be based on transaction data included in the associated merchant profile 210 and/or included in the transaction database 212 and including the merchant identifier included in the respective merchant profile 210.

In step 318, the processing unit 204 may identify one or more target merchant profiles 210. Target merchant profiles 210 may be merchant profiles 210 for whom firmographics data has been received but for whom transaction data is unknown. For example, the processing unit 204 may identify a merchant profile 210 associated with the target merchant 106.

In step 320, the processing unit 204 may identify one or more recommended business services for each target merchant profile 210. Recommended business services may be identified based on firmographics data for each respective merchant profile 210 as well as firmographics and transaction scores for related merchant profiles 210. Related merchant profiles 210 may be identified by the processing unit 204 based on correspondence between the firmographics included in the target merchant profile 210 and the firmographics included in the related merchant profile 210.

In step 322, the transmitting unit 206 of the processing server 102 may transmit the identified recommended business services to the target merchant 106, who may receive the recommendation in step 324. In some instances, the recommended business services may include data identifying and/or associated with one or more service providers associated with each business service, a recommendation for addition or removal of the associated business service, and other data that may be suitable for use by the target merchant 106 in implementing the recommendations generated by the processing unit 204. For example, the recommendations may include pricing information, contact information, revenue projections, consumer survey data, etc.

Process for Identifying Merchants and Service Recommendations

Figure 4:
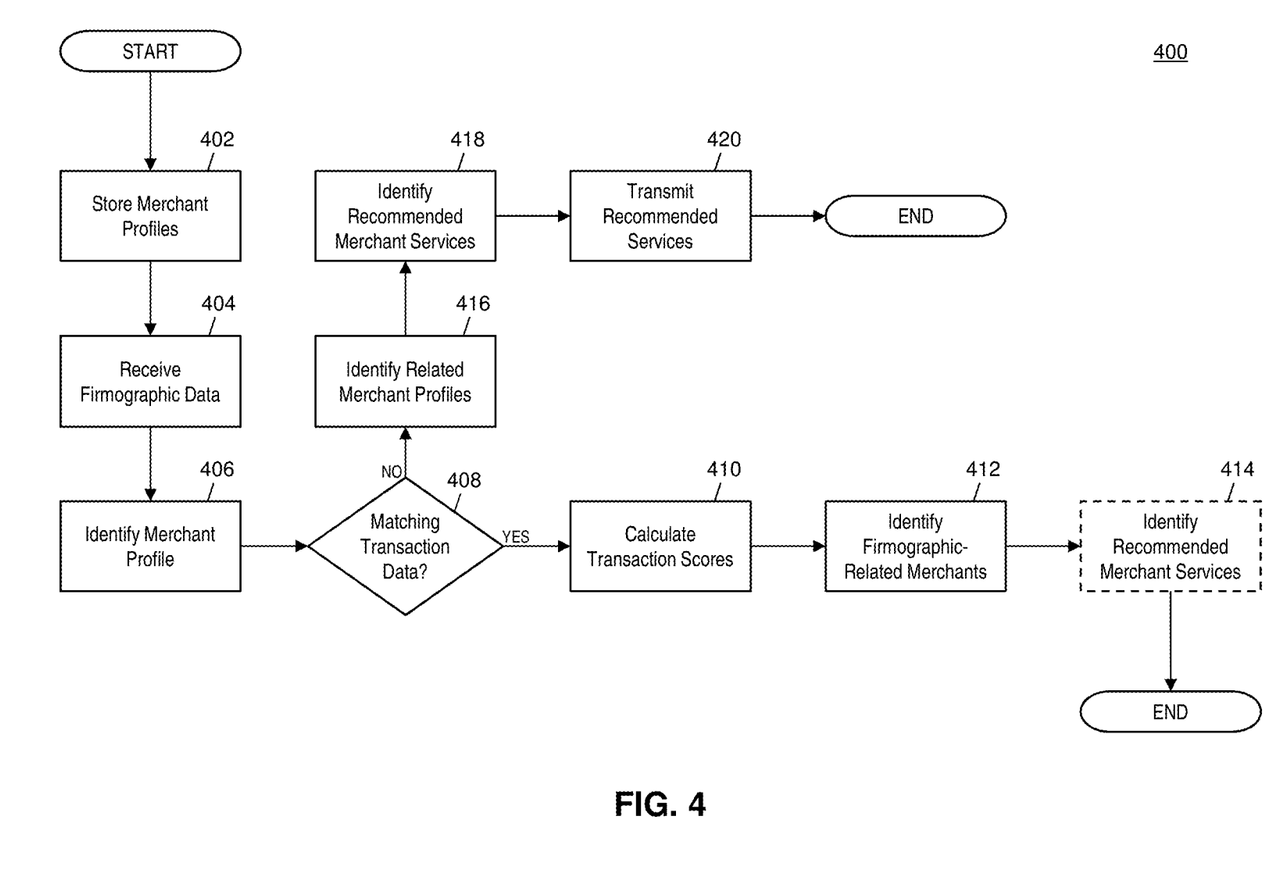
FIG. 4 is a flow diagram illustrating a process for identifying targeted merchants and business services recommendations using the processing server of FIG. 2 in accordance with exemplary embodiments.

FIG. 4 illustrates a process 400 for the processing server 102 to identify target and related merchants and transaction scores for the use in identifying business service recommendations based thereon.

In step 402, the processing unit 204 may store merchant profiles 210 in the merchant database 208. Merchant profiles 210 may include at least a merchant identifier. In some instances, some of the merchant profiles 210 may also include transaction data for payment transactions involving the related merchant. In other instances, the processing server 102 may include the transaction database 212, which may include transaction data entries having transaction data for some of the merchants related to the merchant profiles 210.

In step 404, the receiving unit 202 may receive a data file from the data collection agency 108. The data file may include firmographics data and merchant identifiers for a plurality of merchants 106. In step 406, the processing unit 204 may identify a merchant profile 210 stored in the merchant database 208 to be analyzed. In some instances, the merchant profile 210 that is identified may be based on a request, such as from a merchant 106 or entity associated thereof, for business service recommendations. In other instances, the processing unit 204 may identify a different merchant profile 210 each time in subsequent executions of the process 400, such that each merchant profile 210 may be analyzed.

In step 408, the processing unit 204 may determine if there is transaction data included in the identified merchant profile 210 and/or included in the transaction data entries 214 of the transaction database 212 that match the identified merchant profile 210 (e.g., include a matching merchant identifier). If there is matching transaction data, then, in step 410, the processing unit 204 may calculate transaction scores for the merchant profile 210. The transaction scores may be based on the transaction data included in the merchant profile 210 and/or in the matching transaction data entries 214 in the transaction database 212.

In step 412, the processing unit 204 may identify related merchants 106. The related merchants 106 may be identified based on correspondence between the firmographics for the related merchants 106 (e.g., included in their associated merchant profiles 210) and the firmographics included in the identified merchant profile 210. Correspondence between firmographics can include direct correspondence between values (e.g., same business size, same business type, etc.) and indirect correspondence between values (e.g., different geographic locations have similar traits, such as demographics, market characteristics, etc.). In some instances, the identified merchant profile 210 and/or the merchant profiles 210 for the related merchants may be updated to reflect the identifications, such as including merchant identifiers for the related merchants in the identified merchant profile 210.

In step 414, the processing unit 204 may identify business service recommendations for one or more of the identified related merchants. The business service recommendations may be based on the firmographics for the related merchants and the identified merchant, as well as the transaction scores calculated for the identified merchant profile in step 410. It will be apparent to persons having skill in the relevant art that step 414 may be an optional step. In some instances, step 414 may include transmitting (e.g., by the transmitting unit 206) the recommendations to the related merchants.

If, in step 408, the processing unit 204 determines that there is no transaction data for the identified merchant profile 210, then the process may proceed to step 416, where the processing unit 204 may identify merchant profiles 210 related to the identified merchant profile 210 for the target merchant 106. Related merchant profiles 210 may be merchant profiles 210 that include firmographics that correspond to the firmographics included in the identified merchant profile 210. In some instances, a related merchant profile 210 may be identified based on a transaction score calculated thereof. For instance, the processing unit 204 may identify related merchant profiles that have transaction scores above a predetermined value or an ideal transaction score for one or more categories (e.g., highest propensity to increase sales, highest transaction frequency, etc.). In step 418, the processing unit 204 may identify business services for recommendation to the target merchant 106. The business service recommendations may be identified based on the firmographics included in the identified merchant profile 210 and/or related merchant profiles 210, as well as the transaction scores included in each of the related merchant profiles 210.

In some embodiments, the processing unit 204 may identify business services for recommendation based on data received from the target merchant 106. For example, if the merchant profile 210 is identified based on data received in a recommendation request, such as from the target merchant 106, the recommendation request may also include one or more desired services. In such an instance, the recommended business services may be one of the one or more desired services. For instance, the processing unit 204 may identify the best business service for implementation by the target merchant 106. The best business service may be based on any number of criteria (e.g., which may be specified in the request), such as a business service predicted to have the greatest positive effect on revenue, new consumers, consumer retention, transaction frequency, average ticket size, etc.

Once one or more recommended services have been identified, then, in step 420, the transmitting unit 206 of the processing server 102 may transmit the recommendations to the target merchant 106 or an associated entity. For example, the recommendations may be transmitted to associated service providers, such as service providers that may be able to assist with implementation of the recommended services to the target merchant 106.

Figure 5:
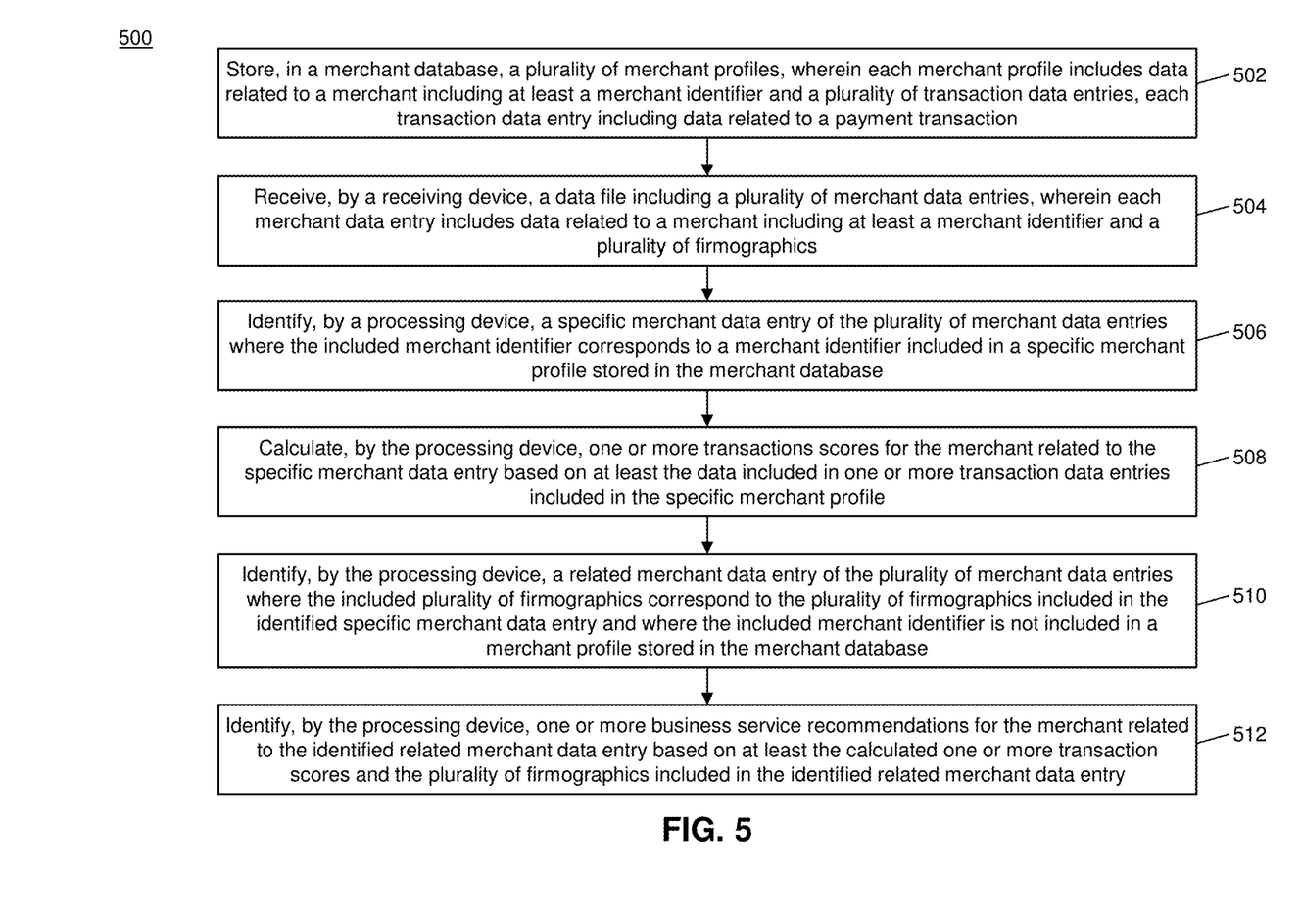
FIG. 5 is a flow chart illustrating an exemplary method for identifying business service recommendations for targeted merchants in accordance with exemplary embodiments.

Exemplary Method for Identifying Business Service Recommendations for Target Merchants FIG. 5 illustrates a method 500 for the identification of business service recommendations for target merchants based on firmographics and transaction scores.

In step 502, a plurality of merchant profiles (e.g., merchant profiles 210) may be stored in a merchant database (e.g., the merchant database 208), wherein each merchant profile 210 includes data related to a merchant (e.g., merchant 106) including at least a merchant identifier and a plurality of transaction data entries, each transaction data entry including data related to a payment transaction. In one embodiment, each merchant profile 210 may include data related to a merchant 106 associated with a specific payment network (e.g., the payment network 104). In some embodiments, the data included in each transaction data entry may include at least one of: transaction time and/or date, transaction amount, geographic location, merchant data, consumer data, payment method, product data, and offer data. In one embodiment, each transaction data entry may include data related to a payment transaction involving the related merchant 106. In some embodiments, each transaction data entry may include data related to a payment transaction involving one or more of a group of merchants including the related merchant 106.

In step 504, a data file may be received by a receiving device (e.g., the receiving unit 202), wherein the data file includes a plurality of merchant data entries, wherein each merchant data entry includes data related to a merchant 106 including at least a merchant identifier and a plurality of firmographics. In some embodiments, the plurality of firmographics may include at least one of: business age, business size, organization type, ownership type, market data, stage data, trend data, customer type, property type, residency, manufacturing type, and technology data.

In step 506, a specific merchant data entry of the plurality of merchant data entries may be identified by a processing device (e.g., the processing unit 204) where the included merchant identifier corresponds to a merchant identifier included in a specific merchant profile 210 stored in the merchant database 208. In step 508, one or more transaction scores may be calculated by the processing device 204 for the merchant 106 related to the specific merchant data entry based on at least the data included in one or more transaction data entries included in the specific merchant profile 210. In one embodiment, the one or more transaction scores may include a propensity to increase sales.

In step 510, a related merchant data entry of the plurality of merchant data entries may be identified by the processing device 204 where the included plurality of firmographics correspond to the plurality of firmographics included in the identified specific merchant data entry and where the included merchant identifier is not included in a merchant profile 210 stored in the merchant database 208.

In step 512, one or more business service recommendations may be identified by the processing device 204 for the merchant 106 related to the identified related merchant data entry based on at least the calculated one or more transaction scores and the plurality of firmographics included in the identified related merchant data entry. In some embodiments, the one or more business service recommendations may include at least one of: information technology, information security, human resources, docketing, customer service, benefits, and office services. In one embodiment, the method 500 may further include transmitting, by a transmitting device (e.g., the transmitting unit 206), the identified one or more business service recommendations to the merchant 106 related to the identified relation merchant data entry.

In some embodiments, the method 500 may also include identifying, by the processing device 204, a set of merchant data entries of the plurality of merchant data entries, wherein each merchant data entry in the set includes a merchant identifier included in a corresponding merchant profile 210 of the plurality of merchant profiles stored in the merchant database 208, wherein: calculating the one or more transaction scores includes calculating one or more transaction scores for each merchant 106 related to a merchant data entry included in the identified set of merchant data entries based on at least the data included in one or more transaction data entries included in the corresponding merchant profile 210; and the specific merchant data entry is identified based on the one or more transaction scores calculated for the merchant 106 related to the specific merchant data entry and the one or more transaction scores calculated for each merchant 106 related to a merchant data entry included in the identified set of merchant data entries.

Computer System Architecture

Figure 6:
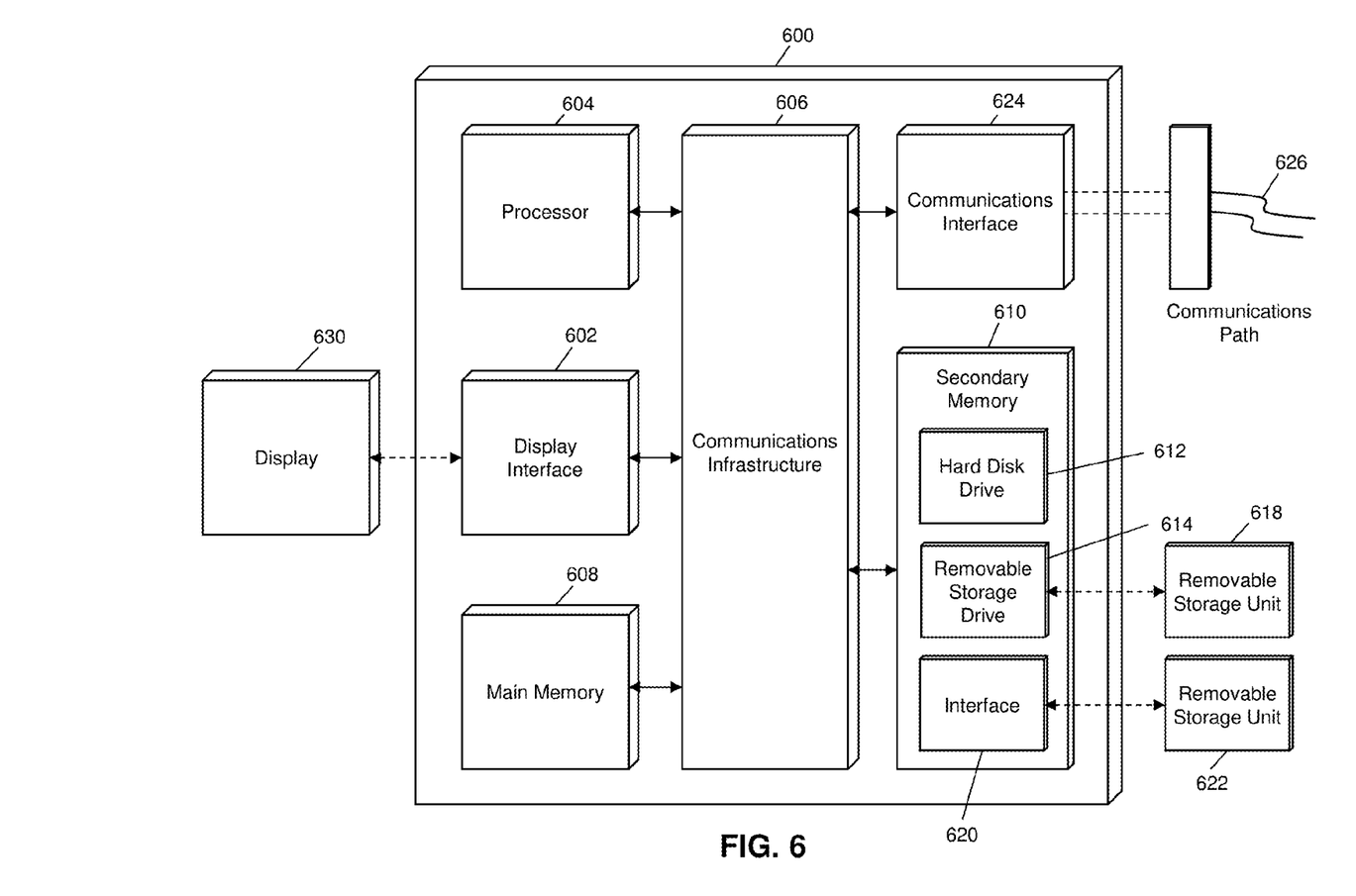
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for identifying business service recommendations for targeted merchants. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying business service recommendations for targeted merchants, comprising:
   storing, in a merchant database, a plurality of merchant profiles, wherein each merchant profile includes data related to a merchant including at least a merchant identifier and a plurality of transaction data entries, each transaction data entry including data related to a payment transaction;
   receiving, by a receiving device, a data file including a plurality of merchant data entries, wherein each merchant data entry includes data related to a merchant including at least a merchant identifier and a plurality of firmographics;
   identifying, by a processing device, a specific merchant data entry of the plurality of merchant data entries where the included merchant identifier corresponds to a merchant identifier included in a specific merchant profile stored in the merchant database;
   calculating, by the processing device, one or more transactions scores for the merchant related to the specific merchant data entry based on at least the data included in one or more transaction data entries included in the specific merchant profile;
   identifying, by the processing device, a related merchant data entry of the plurality of merchant data entries where the included plurality of firmographics correspond to the plurality of firmographics included in the identified specific merchant data entry and where the included merchant identifier is not included in a merchant profile stored in the merchant database; and
   identifying, by the processing device, one or more business service recommendations to adopt one or more business services for the merchant related to the identified related merchant data entry based on at least the calculated one or more transaction scores and the plurality of firmographics included in the identified related merchant data entry.

2. The method of claim 1, wherein each merchant profile includes data related to a merchant associated with a specific payment network.

3. The method of claim 1, further comprising:
   transmitting, by a transmitting device, the identified one or more business service recommendations to the merchant related to the identified related merchant data entry.

4. The method of claim 1, wherein the one or more business service recommendations include at least one of: information technology, information security, human resources, docketing, customer service, benefits, and office services.

5. The method of claim 1, wherein the plurality of firmographics includes at least one of: business age, business size, organization type, ownership type, market data, stage data, trend data, customer type, property type, residency, manufacturing type, and technology data.

6. The method of claim 1, wherein the one or more transaction scores include a propensity to increase sales.

7. The method of claim 1, further comprising:
identifying, by the processing device, a set of merchant data entries of the plurality of merchant data entries, wherein each merchant data entry in the set includes a merchant identifier included in a corresponding merchant profile of the plurality of merchant profiles stored in the merchant database, wherein calculating the one or more transaction scores includes calculating one or more transaction scores for each merchant related to a merchant data entry included in the identified set of merchant data entries based on at least the data included in one or more transaction data entries included in the corresponding merchant profile, and the specific merchant data entry is identified based on the one or more transaction scores calculated for the merchant related to the specific merchant data entry and the one or more transaction scores calculated for each merchant related to a merchant data entry included in the identified set of merchant data entries.

8. The method of claim 1, wherein the data included in each transaction data entry includes at least one of: transaction time and/or date, transaction amount, geographic location, merchant data, consumer data, payment method, product data, and offer data.

9. The method of claim 1, wherein each transaction data entry includes data related to a payment transaction involving the related merchant.

10. The method of claim 1, wherein each transaction data entry includes data related to a payment transaction involving one or more of a group of merchants including the related merchant.

11. A system for identifying business service recommendations for targeted merchants, comprising:
a merchant database configured to store a plurality of merchant profiles, wherein each merchant profile includes data related to a merchant including at least a merchant identifier and a plurality of transaction data entries, each transaction data entry including data related to a payment transaction;
a receiving device configured to receive a data file including a plurality of merchant data entries, wherein each merchant data entry includes data related to a merchant including at least a merchant identifier and a plurality of firmographics; and
a processing device configured to
identify a specific merchant data entry of the plurality of merchant data entries where the included merchant identifier corresponds to a merchant identifier included in a specific merchant profile stored in the merchant database,
calculate one or more transactions scores for the merchant related to the specific merchant data entry based on at least the data included in one or more transaction data entries included in the specific merchant profile,
identify a related merchant data entry of the plurality of merchant data entries where the included plurality of firmographics correspond to the plurality of firmographics included in the identified specific merchant data entry and where the included merchant identifier is not included in a merchant profile stored in the merchant database, and
identify one or more business service recommendations to adopt one or more business services for the merchant related to the identified related merchant data entry based on at least the calculated one or more transaction scores and the plurality of firmographics included in the identified related merchant data entry.

12. The system of claim 11, wherein each merchant profile includes data related to a merchant associated with a specific payment network.

13. The system of claim 11, further comprising:
a transmitting device configured to transmit the identified one or more business service recommendations to the merchant related to the identified related merchant data entry.

14. The system of claim 11, wherein the one or more business service recommendations include at least one of: information technology, information security, human resources, docketing, customer service, benefits, and office services.

15. The system of claim 11, wherein the plurality of firmographics includes at least one of: business age, business size, organization type, ownership type, market data, stage data, trend data, customer type, property type, residency, manufacturing type, and technology data.

16. The system of claim 11, wherein the one or more transaction scores include a propensity to increase sales.

17. The system of claim 11, wherein
the processing device is further configured to identify a set of merchant data entries of the plurality of merchant data entries, wherein each merchant data entry in the set includes a merchant identifier included in a corresponding merchant profile of the plurality of merchant profiles stored in the merchant database, calculating the one or more transaction scores includes calculating one or more transaction scores for each merchant related to a merchant data entry included in the identified set of merchant data entries based on at least the data included in one or more transaction data entries included in the corresponding merchant profile, and the specific merchant data entry is identified based on the one or more transaction scores calculated for the merchant related to the specific merchant data entry and the one or more transaction scores calculated for each merchant related to a merchant data entry included in the identified set of merchant data entries.

18. The system of claim 11, wherein the data included in each transaction data entry includes at least one of: transaction time and/or date, transaction amount, geographic location, merchant data, consumer data, payment method, product data, and offer data.

19. The system of claim 11, wherein each transaction data entry includes data related to a payment transaction involving the related merchant.

20. The system of claim 11, wherein each transaction data entry includes data related to a payment transaction involving one or more of a group of merchants including the related merchant.

* * * * *